(12) United States Patent
Chinniah et al.

(10) Patent No.: US 6,724,543 B1
(45) Date of Patent: Apr. 20, 2004

(54) LIGHT COLLECTION ASSEMBLY HAVING MIXED CONIC SHAPES FOR USE WITH VARIOUS LIGHT EMITTING SOURCES

(75) Inventors: Jeyachandrabose Chinniah, Ann Arbor, MI (US); Edwin M. Sayers, Saline, MI (US); Balvantrai G. Patel, Jacksonville, FL (US)

(73) Assignee: Visteon Global Technologies, Inc., Dearborn, MI (US)

( * ) Notice: Subject to any disclaimer, the term of this patent is extended or adjusted under 35 U.S.C. 154(b) by 1 day.

(21) Appl. No.: 10/278,472

(22) Filed: Oct. 23, 2002

(51) Int. Cl.[7] ............... G02B 3/02; F21V 5/04; F21V 5/00; F21V 11/00
(52) U.S. Cl. ............ 359/718; 362/335; 362/327; 362/355
(58) Field of Search ............ 359/718; 362/333, 362/335, 327, 355

(56) References Cited

U.S. PATENT DOCUMENTS

| | | | |
|---|---|---|---|
| 2,215,900 A | 9/1940 | Bitner | 362/209 |
| 2,254,961 A | 9/1941 | Harris | 362/327 |
| 5,485,317 A | 1/1996 | Perissinotto et al. | 359/712 |
| 5,526,190 A * | 6/1996 | Hubble et al. | 359/719 |
| 5,898,267 A | 4/1999 | McDermott | 313/512 |
| 5,926,320 A | 7/1999 | Parkyn, Jr. et al. | 359/641 |
| 6,367,950 B1 | 4/2002 | Yamada et al. | 362/245 |
| 2002/0080615 A1 | 6/2002 | Marchall et al. | 362/333 |

* cited by examiner

Primary Examiner—David N. Spector
(74) Attorney, Agent, or Firm—Brinks Hofer Gilson & Lione

(57) ABSTRACT

A lens assembly is disclosed for use with various light emitting sources. The lens assembly includes a central section and an outer section. The central section is radially centered on an optical axis. The outer section radially surrounds the central section and is radially centered on the optical axis. The outer section includes an outer wall that has a generally rotated parabolic shape, an inner wall that abuts the central section, and a slanted front surface extending between the inner wall and the outer wall. The front surface is the area of the lens assembly axially farthest away from the light emitting source.

24 Claims, 7 Drawing Sheets

LIGHT COLLECTION ASSEMBLY HAVING MIXED CONIC SHAPES FOR USE WITH VARIOUS LIGHT EMITTING SOURCES

TECHNICAL FIELD

This invention relates generally to lighting systems and, more specifically, to an efficient light collection assembly for use with a light emitting source. The assembly according to the present invention will find utility in vehicle lighting systems, as well as in a variety of non-automotive illumination applications.

BACKGROUND

It is known to use light emitting sources, including light emitting diodes (LEDs), Lambertian emitters, $2\pi$ emitters, and fiber optic light guide tips, in a variety of applications, including, but not limited to, vehicular applications. Specifically, LED sources are increasingly finding applications in automotive, commercial, and general lighting applications since their light outputs have increased exponentially and prices have fallen significantly over the past few years. LEDs are attractive due to their small size and the fact that they consume less power relative to incandescent light sources. The popularity of LEDs as light sources is expected to continue and increase as their potential benefits are further developed, particularly with respect to increased light output.

Today's LEDs come in different sizes and different emitting cone angles. An emitting cone angle is typically referred to as $2\phi$. LEDs emit light over a wide range of cone angles, ranging from 15 degrees (forward emitting or side emitting) to 180 degrees (hemispherical emitting). It is therefore very important to construct efficient light collection assemblies to harness the maximum possible light output from LEDs and direct it in a predetermined controlled manner.

Thus, there is a need in the lighting systems field to create an improved light collection device that can be used with any type of LED to direct the light dispersion in a predetermined manner. This invention provides such an improved LED light collection device.

SUMMARY

The present invention addresses these requirements by providing a lens assembly including a central section and an outer section. The central section is radially centered on an optical axis. The outer section radially surrounds the central section and is centered on the optical axis. The outer section has a generally rotated parabolic shaped outer wall, an inner wall that abuts the central section, and a slanted front surface that extends between the inner wall and the outer wall. The lens assembly of the present invention can also be combined with beam spreading optic elements such as pillows, flutes, and prisms.

An advantage of the lens assembly of the present invention is that it redirects light into a predetermined pattern regardless of the type of light emitting source used.

These and other aspects and advantages of the present invention will become apparent upon reading the following detailed description of the invention in combination with the accompanying drawings.

DETAILED DESCRIPTION

Figure 1:
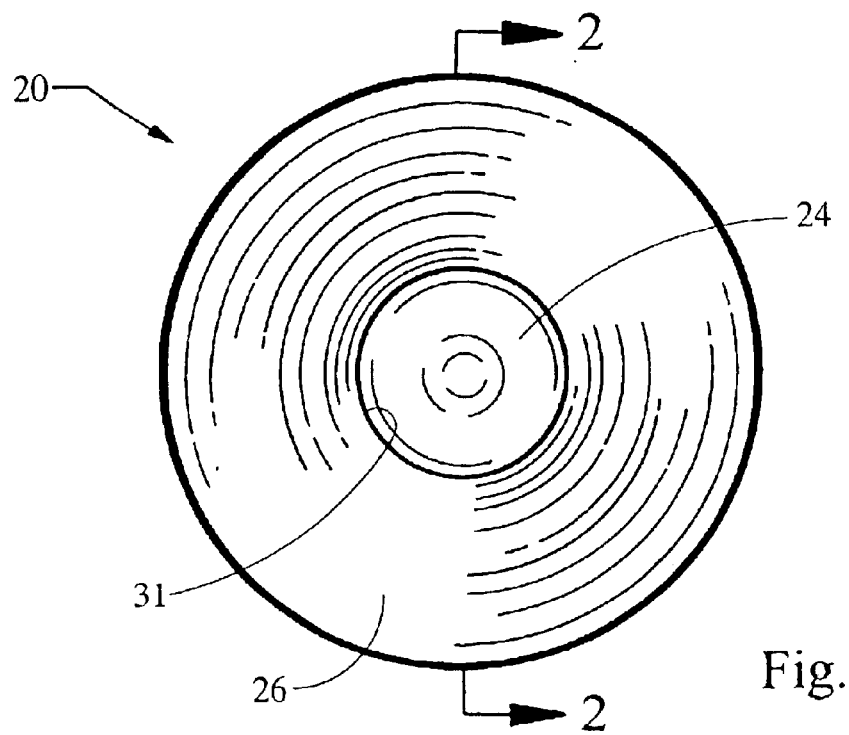
FIG. 1 is an axial view of a first embodiment of the present invention.
Figure 2:
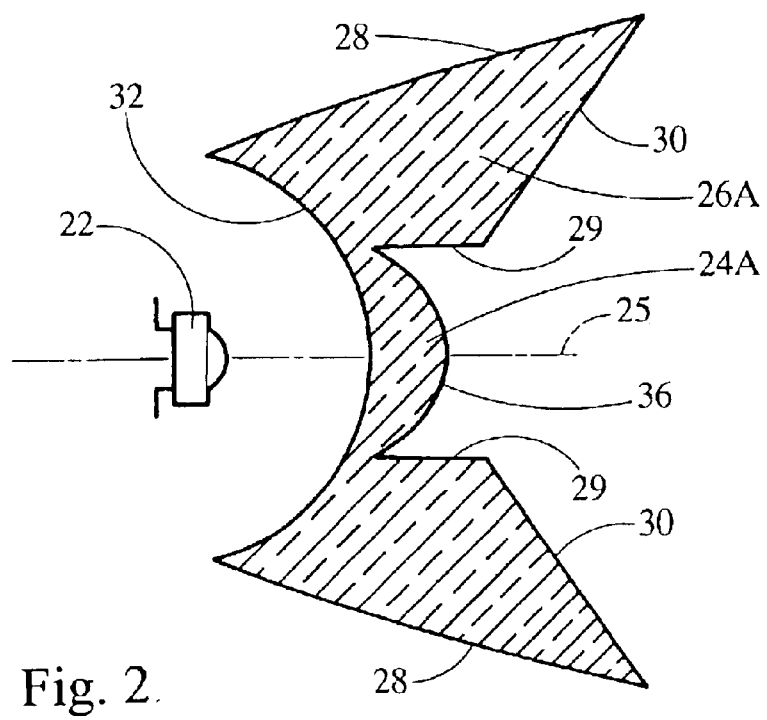
FIG. 2 is a partial cross-sectional view taken along the line 2—2 in FIG. 1.

As shown in FIGS. 1 and 2, the lens assembly of the present invention is generally designated at 20. The lens assembly 20 includes a central section 24 and an outer section 26. Further, the lens assembly 20 is used with a light emitting source 22 (seen in FIG. 2). Although Light Emitting Diodes (LEDs) are shown in all the figures, the lens assembly 20 can be used with a variety of different light emitting sources 22, including, but not limited to, LEDs, Lambertian emitters, $2\pi$ emitters, and fiber optic light guide tips. The light emitting source 22 defines an optical axis 25. The lens assembly 22 is designed to be used with a variety of types of light emitting sources to reflect and refract the light rays so that they exit the lens assembly 20 collimated.

The widest diameter of the lens assembly 20, as measured by the outer diameter of the outer section is approximately ten–fifteen (10–15) millimeters. This small size allows the lens assembly to be easily used with the types of light emitting sources outlined above. Further, the lens assembly 20 is preferably molded of acrylic, polycarbonate, or similar moldable materials.

The central section 24 of the lens assembly 20 is centered on the optical axis 25. The outer section 26 radially surrounds the central section and is also centered on the optical axis 25. When viewed axially, as shown in FIG. 1, the central section 24 is generally circular-shaped and the outer section 26 is generally annular-shaped.

Figure 3:
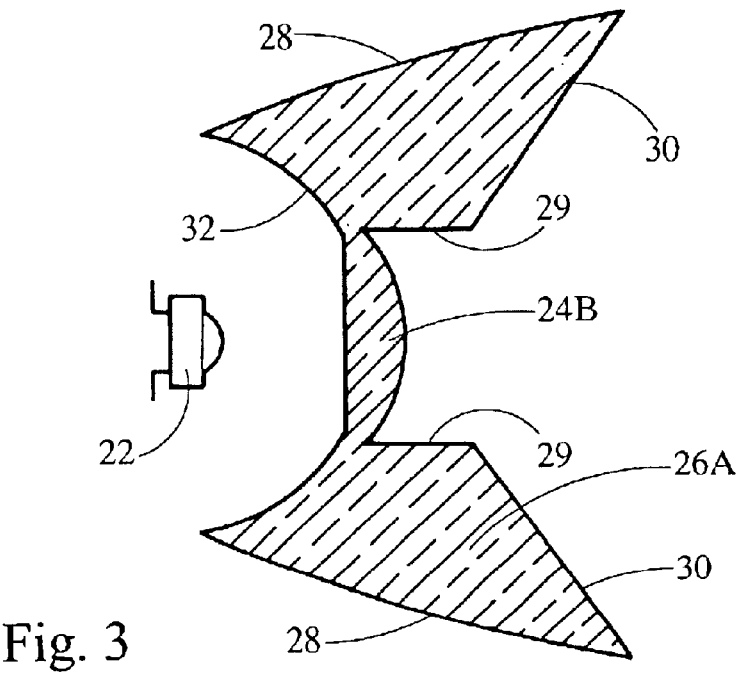
FIG. 3 is a partial cross-sectional view of a second embodiment of the present invention.
Figure 4:
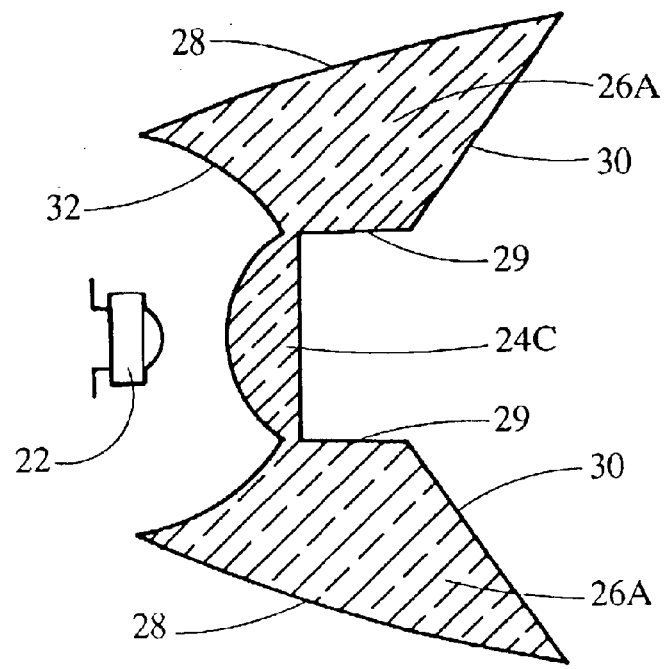
FIG. 4 is a partial cross-sectional view of a third embodiment of the present invention.
Figure 5:
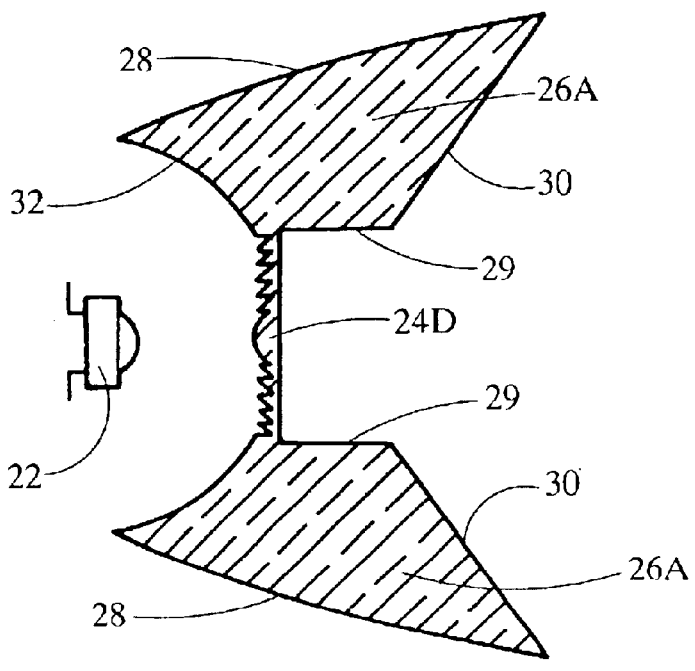
FIG. 5 is a partial cross-sectional view of a fourth embodiment of the present invention.

The central section 24 can be one of four different designs. The first design, shown in FIG. 2, is a spherical-elliptical lens 24A. The second design, shown in FIG. 3, is a plano-convex aspheric condenser lens 24B. The third design, shown in FIG. 4, is a hyperbolic-plane lens 24C. The fourth design, shown in FIG. 5, is a Fresnel lens 24D. The Fresnel optics can be either on the inner side or the outer side.

The outer section 26 of the lens assembly has a generally rotated parabolic shaped radial outer wall 28. A rotated parabola is a regular parabola with a point source at its focal point. This parabola is rotated about an axis normal to the plane of the parabola through the focal point resulting in the rays being tilted by the rotated angle.

The outer section 26 also includes a radial inner wall 29. The inner wall 29 is radially centered on the optical axis and is preferably generally cylindrical-shaped.

Figure 12:
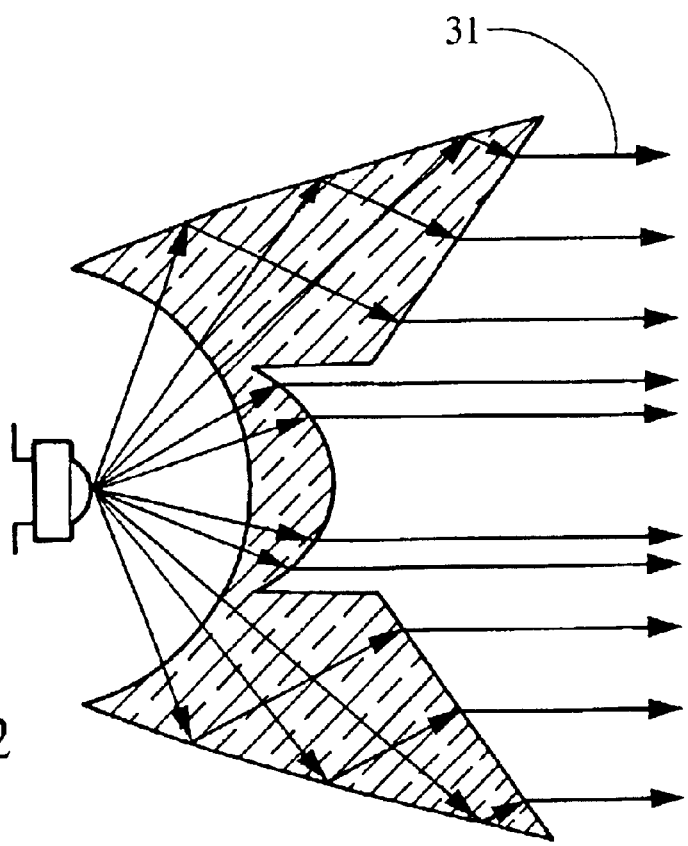
FIG. 12 is a partial cross-sectional view showing the path of the rays of light for one embodiment.
Figure 13A:
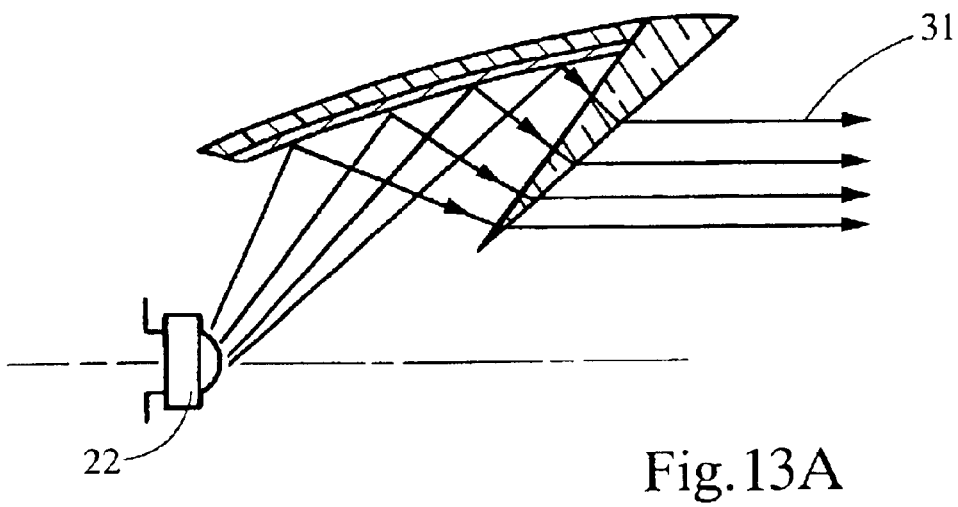
FIG. 13A is a partial cross-sectional view showing the path of the rays of light for another embodiment.
Figure 13B:
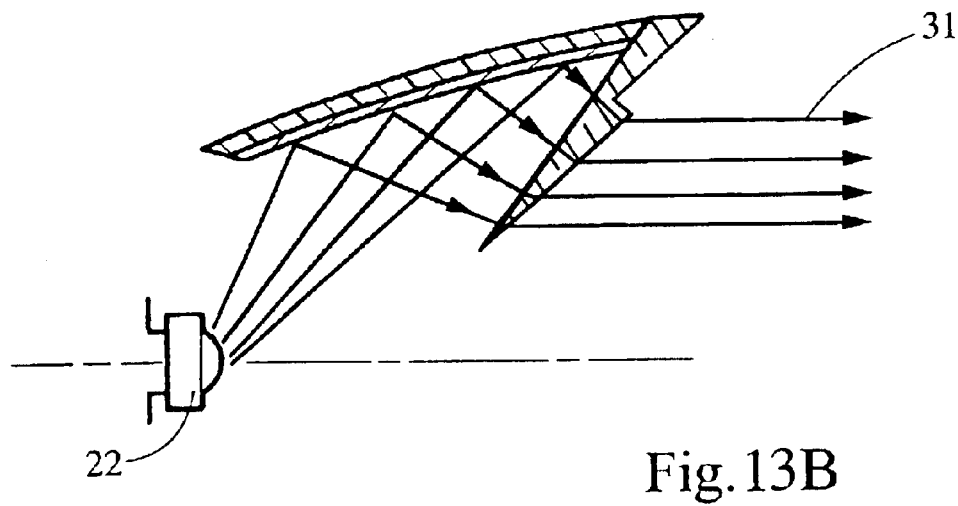
FIG. 13B is a partial cross-sectional view showing the path of the rays of light for yet another embodiment.

The inner wall 29, which extends between the inner section 24 and the slanted front surface 30, allows the overall thickness of the lens assembly 20 to remain as small as possible. Thus, the central section is axially offset from the slanted front surface. This design feature allows the light rays 31 to reflect and refract as necessary to end up collimated through both the central section and the outer section, as shown in FIGS. 12, 13A and 13B.

Figure 9:
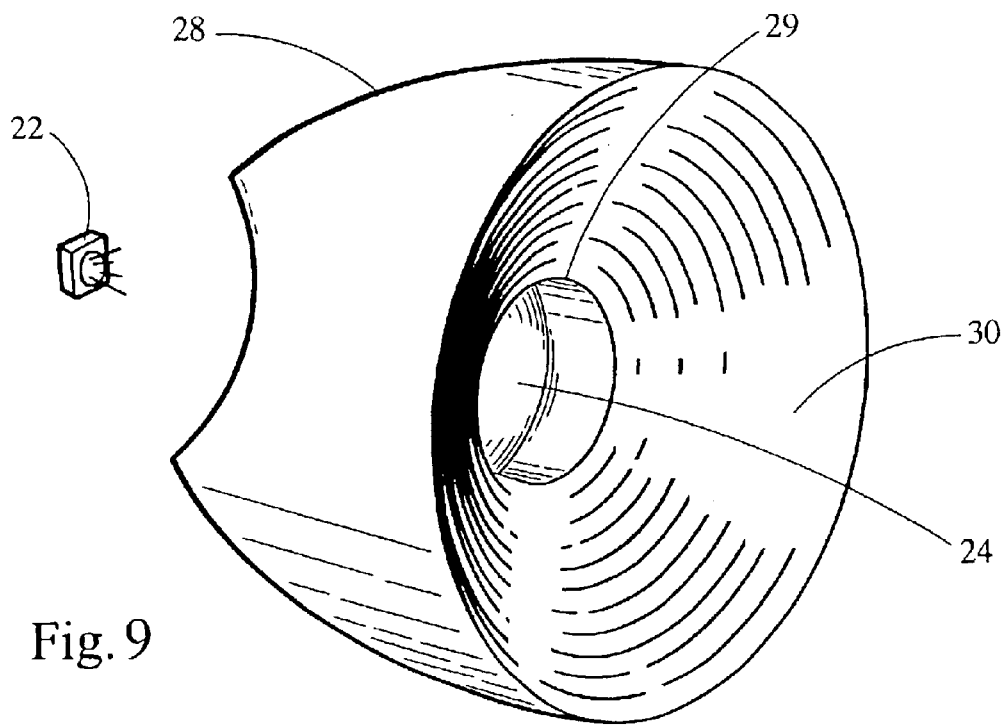
FIG. 9 is an extended perspective view of FIG. 2.

The front surface 30 of the outer section is the area of the outer section 26 that is axially farthest away from the light emitting source 22. The front surface 30 of the outer section extends between the inner wall 29 and the outer wall 28 and is slanted from a cross sectional view, as shown in FIG. 2. Specifically, the radial inner wall 29 ends axially closer to the light emitting source 22 than the radial outer wall 28. From a perspective view, as shown in FIG. 9, the slanted front surface 30 in combination with the outer wall 28 is generally bowl-shaped.

There are two embodiments of the lens assembly outer section 26. In a first embodiment, shown in FIGS. 2–5, the outer section 26A is a solid internally reflective lens. There is an inner surface 32 of the solid lens that is axially nearest the light emitting source 22. The inner surface 32 of the outer section 26 is generally spherically-shaped. Further, the inner surface 32 extends between the central section 24 and the outer wall 28.

Figure 10:
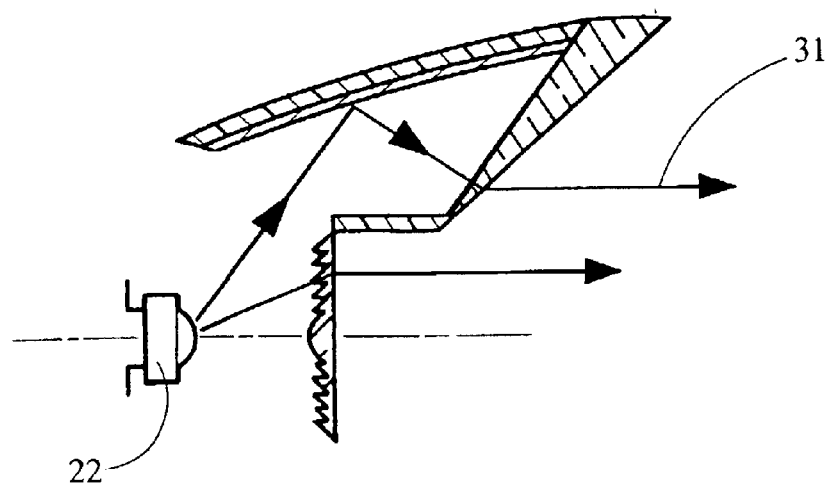
FIG. 10 is a partial cross-sectional view of a second embodiment of the outer section.
Figure 11:
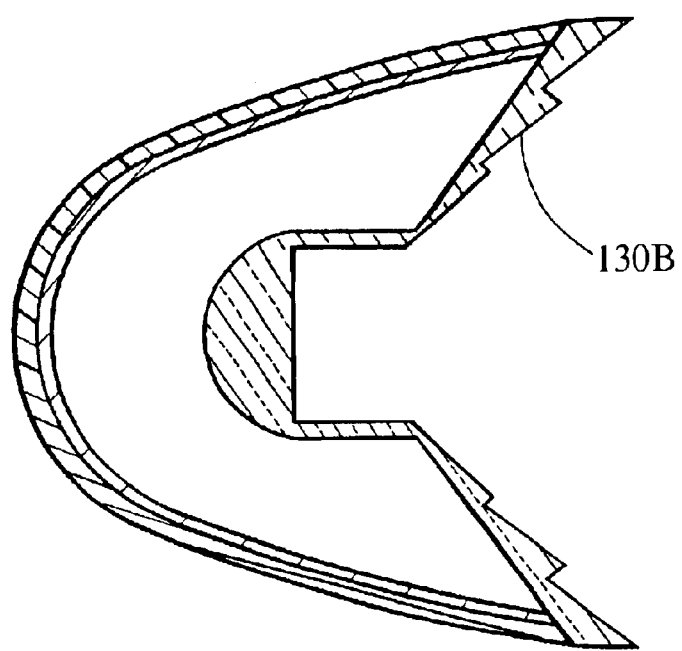
FIG. 11 is a partial cross-sectional view of a second embodiment of the corrective lens.

In a second embodiment, shown in FIGS. 10–11, the outer section 26B includes a reflective surface as the radial outer wall 28 and a corrective lens as the slanted front surface 30. The corrective lens can be either a continuous slanted front surface 130A, shown in FIG. 10, or it can be a stepped slanted front surface 130B, shown in FIG. 11. An advantage of the stepped slanted front surface 130B is that the rays of light are refracted to collimate exactly as with the continuous slanted front surface 130A, but with a thinner lens than the continuous slanted front surface 130A.

For all of the possible combinations, the inner section and the outer section can be either a unitary component or they can be separate components that attach to each other via conventional means.

Spreading optics 34 may also be incorporated into the lens assembly 20. Some specific examples of spreading optics include, but are not limited to, pillows, flutes and prisms. Spreading optics are designed to disperse light beams in a predetermined manner. Depending on the application criteria, some designs could spread the light horizontally, while other designs could be limited to spreading the light vertically. Further, there are spreading optics that can spread the light in all directions.

Figure 6:
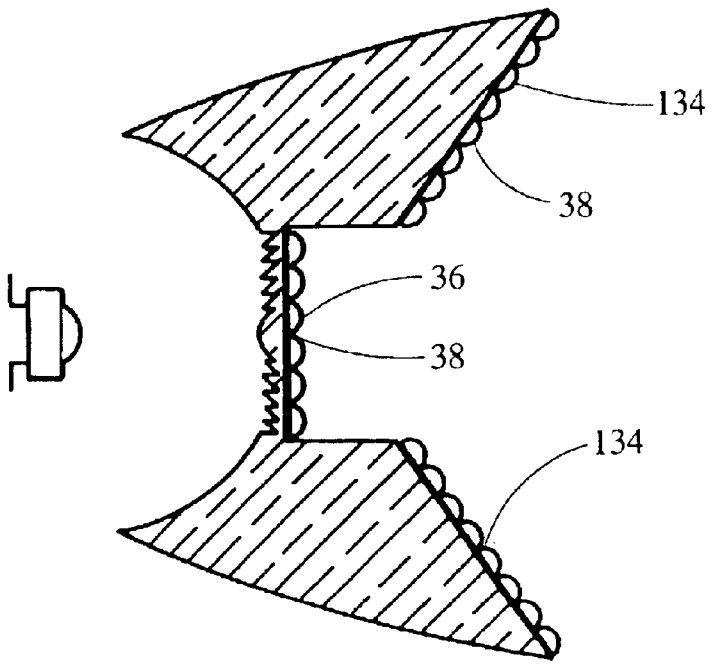
FIG. 6 is a partial cross-sectional view of a first embodiment of the spreading optics.

There are a variety of arrangements for incorporating the spreading optics 34 into the lens assembly 20. In one embodiment, shown in FIG. 6, the spreading optics 134 are integral with the composite front surface 38 of the lens assembly 20. The composite front surface 38 of the lens assembly 20 includes the slanted front surface 30 of the outer section 26 and the front surface 36 of the center section 24. The spreading optics 34 can be on just the outer section 26, just the central section 24 or on the composite front surface 38.

Figure 7:
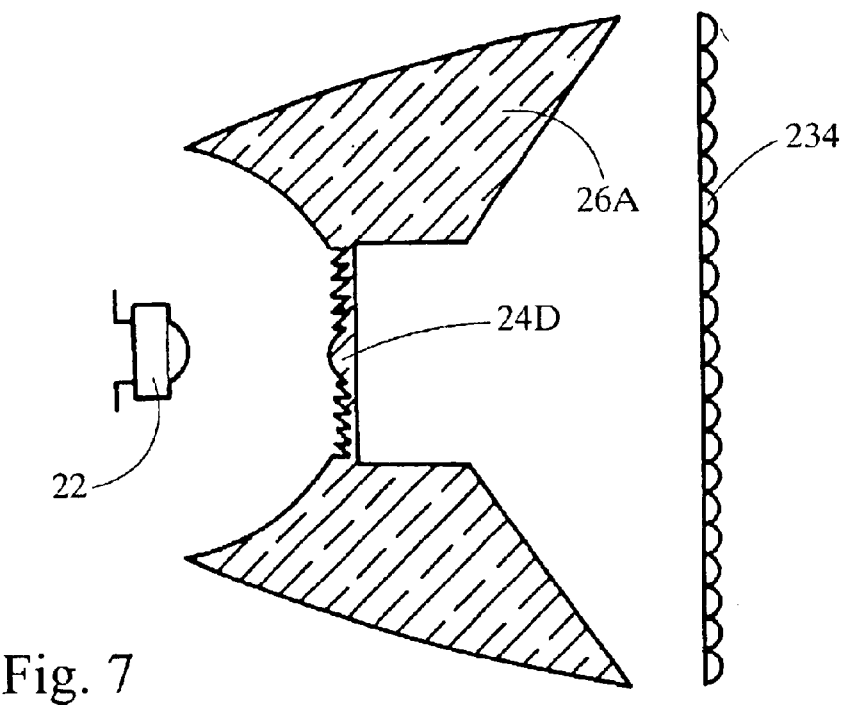
FIG. 7 is a partial cross-sectional view of a second embodiment of the spreading optics.

In a second embodiment, shown in FIG. 7, the spreading optics 234 are axially spaced apart from the central section 24 and the outer section 26.

Figure 8:
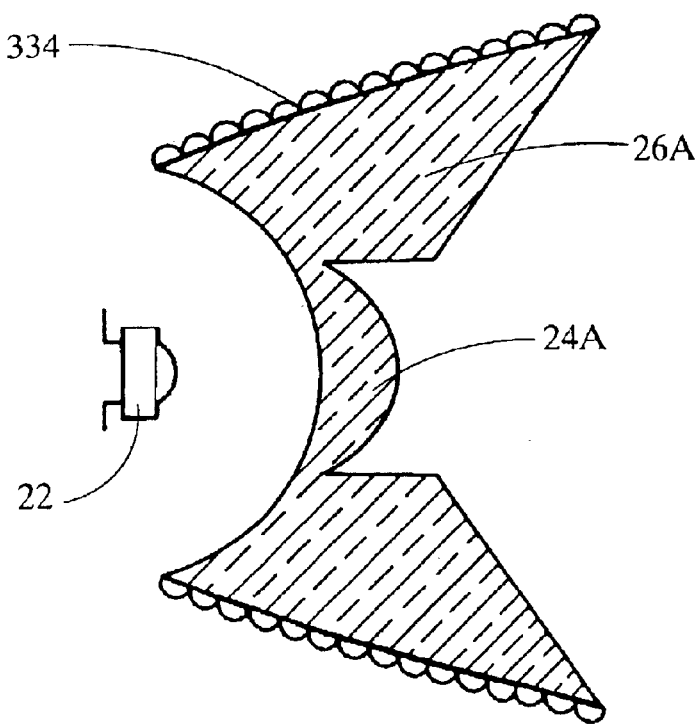
FIG. 8 is a partial cross-sectional view of a third embodiment of the spreading optics.

In a third embodiment, shown in FIG. 8, the spreading optics 334 are integral with the outer section outer wall 28.

As any person skilled in the art of lens assemblies will recognize from the previous detailed description and from the figures and claims, modifications and changes can be made to the preferred embodiments of the invention without departing from the scope of this invention defined in the following claims.

We claim:

1. A lens assembly for use with a light emitting source defining an optical axis, the lens assembly comprising:
    a central section radially centered on the optical axis; and
    an outer section radially surrounding said central section and centered on the optical axis, wherein said outer section has a generally rotated parabolic shaped outer wall, an inner wall abutting said central section, and a slanted front surface extending between said inner wall and said outer wall.

2. The lens assembly of claim 1 wherein said inner wall is radially centered on the optical axis.

3. The lens assembly of claim 1 wherein said inner wall is generally cylindrical-shaped.

4. The lens assembly of claim 1 wherein said central section is a spherical-elliptical lens.

5. The lens assembly of claim 4 wherein said central section has a front surface and said central section front surface and said outer section slanted front surface comprise a lens assembly composite front surface, said lens assembly further comprising spreading optics on any section of said composite front surface.

6. The lens assembly of claim 4 further comprising an outer spreading optics assembly centered on the optical axis and axially spaced apart from said central section and said outer section.

7. The lens assembly of claim 4 further comprising outer spreading optics integral with said outer section outer wall.

8. The lens assembly of claim 1 wherein said central section is a plano-convex aspheric condenser lens.

9. The lens assembly of claim 8 wherein said central section has a front surface and said central section front surface and said outer section slanted front surface comprise a lens assembly composite front surface, said lens assembly further comprising spreading optics on any section of said composite front surface.

10. The lens assembly of claim 8 further comprising an outer spreading optics assembly centered on the optical axis and axially spaced apart from said central section and said outer section.

11. The lens assembly of claim 8 further comprising outer spreading optics integrated with said outer section outer wall.

12. The lens assembly of claim 1 wherein said central section is a hyperbolic plane lens.

13. The lens assembly of claim 12 wherein said central section has a front surface and said central section front surface and said outer section slanted front surface comprise a lens assembly composite front surface, said lens assembly further comprising spreading optics on said composite front surface.

14. The lens assembly of claim 12 further comprising an outer spreading optics assembly centered on the optical axis and axially spaced apart from said central section and said outer section.

15. The lens assembly of claim 12 further comprising outer spreading optics integral with said outer section outer wall.

16. The lens assembly of claim 1 wherein said central section is a Fresnel lens.

17. The lens assembly of claim 16 wherein said central section has a front surface and said central section front surface and said outer section slanted front surface comprise a lens assembly composite front surface, said lens assembly further comprising spreading optics on any section of said composite front surface.

18. The lens assembly of claim 16 further comprising an outer spreading optics assembly centered on the optical axis and axially spaced apart from said central section and said outer section.

19. The lens assembly of claim 16 further comprising outer spreading optics integral with said outer section outer wall.

20. The lens assembly of claim 1 wherein said central section has a front surface and said central section front surface and said outer section slanted front surface comprise a lens assembly composite front surface, said lens assembly further comprising spreading optics on any section of said composite front surface.

21. The lens assembly of claim 1 further comprising an outer spreading optics assembly centered on the optical axis and axially spaced apart from said central section and said outer section.

22. The lens assembly of claim 1 further comprising outer spreading optics integral with said outer section outer wall.

23. The lens assembly of claim 1 wherein said outer section is a solid internally reflective lens having a spherical inner surface extending between said central section and said outer wall.

24. The lens assembly of claim 1 wherein said outer wall is a reflective surface and said slanted front surface is a corrective lens.

* * * * *